United States Patent
Ma et al.

(10) Patent No.: US 9,531,535 B2
(45) Date of Patent: Dec. 27, 2016

(54) SECURE MEMORIES USING UNIQUE IDENTIFICATION ELEMENTS

(71) Applicant: Maxim Integrated Products, Inc., San Jose, CA (US)

(72) Inventors: Edward Tangkwai Ma, Plano, TX (US); Sung Ung Kwak, Frisco, TX (US); Donald W. Loomis, III, Coppell, TX (US); Robert Michael Muchsel, Addison, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 46 days.

(21) Appl. No.: 14/492,467

(22) Filed: Sep. 22, 2014

(65) Prior Publication Data

US 2016/0087795 A1    Mar. 24, 2016

Related U.S. Application Data

(60) Provisional application No. 61/886,824, filed on Oct. 4, 2013.

(51) Int. Cl.
*H04L 9/00* (2006.01)
*H04L 9/08* (2006.01)
*G06F 12/14* (2006.01)

(52) U.S. Cl.
CPC ......... *H04L 9/0822* (2013.01); *G06F 12/1408* (2013.01); *G06F 2212/1052* (2013.01)

(58) Field of Classification Search
CPC ..................................... H04L 9/0822
USPC .......................................... 713/190
See application file for complete search history.

(56) References Cited

U.S. PATENT DOCUMENTS

| | | | |
|---|---|---|---|
| 6,226,726 B1 * | 5/2001 | Kermani | G06F 12/06 711/154 |
| 7,383,521 B2 * | 6/2008 | Smith | G06F 17/5068 716/114 |
| 8,250,375 B2 * | 8/2012 | Carpenter | G06F 21/73 380/264 |

OTHER PUBLICATIONS

Hoff, David et al., "System and software security via authentication handshake in EPROM," from the collection of the Computer History Museum (www.computerhistory.org), pp. 203-210, National Computer Conference, 1985.

* cited by examiner

*Primary Examiner* — Longbit Chai
(74) *Attorney, Agent, or Firm* — North Weber & Baugh LLP

(57) ABSTRACT

Various embodiments of the invention relate to secure systems and modules, and more particularly, to systems, devices and methods of generating and applying identification elements uniquely associated with memory, memory mapping and encrypted storage. These unique identification elements provide an improved, statistically random source from which keys and memory mappings may be derived. The application of these keys across various architectures result in an improvement in the security of data stored within a system.

20 Claims, 6 Drawing Sheets

SECURE MEMORIES USING UNIQUE IDENTIFICATION ELEMENTS

CROSS REFERENCE TO RELATED APPLICATION

The application claims priority under 35 U.S.C. §119(e) to Provisional Application Ser. No. 61/886,824, entitled "Secure Memories Using Unique Identification Elements," filed on Oct. 4, 2013, the subject matter of which is hereby incorporated herein by reference in its entirety.

BACKGROUND

A. Technical Field

The present invention relates generally to secure microcontroller systems and/or modules, and more particularly to systems and methods related to the protection of embedded memories and the enablement of self-securing memory elements within a memory system architecture.

B. Background of the Invention

The importance of data security within today's computing systems is well understood by one of skill in the art. Significant research and development has occurred across numerous markets in an attempt to establish security protocols and architectures that maintain the integrity of data stored within memory systems. Although these efforts have resulted in major improvements to secure systems, there still remains meaningful risk that data stored within a secure system can become compromised.

The difficulty in designing and maintaining a secure computing system is related to the daunting task of addressing all of the potential vulnerabilities of the system that may compromise data security. One such vulnerability is the manner in which encryption keys are generated and maintained within the secure system as well as how these keys are implemented in storage operations. If encryption keys are not derived from a sufficiently random and/or unique source, then the keys could potentially be replicated by an attacker and used to obtain information from the system. For example, if an individual is able to predict a pseudo-random number used to seed encryption keys within the system (e.g., understand the algorithm used to generate the number), then that individual could derive encryption keys to decrypt data stored in the system. As a result, security engineers are constantly looking for ways in which the randomness of keys may be increased.

A second vulnerability relates to the address mapping of a memory that defines the process in which data is stored across a plurality of memory cells. In some memory systems, address decoders effectively scramble the storage sequence of data across memory cells in accordance to a pre-defined memory mapping. This mapping is not unique to a specific memory module but shared across compatible memories that may be found in many devices. As a result, once a memory mapping is compromised within one device, that memory map can be applied to other compatible memories to attack stored data in other devices.

FIG. 1 illustrates a standard memory architecture used within various computing systems. In certain memory systems, the design has a physical arrangement with a dense memory cell array and a less compact peripheral area that includes address decoder, multiplex, and sense circuits as well as inputs and outputs. For some nonvolatile memories, the peripheral area also contains sequencer circuitry that supports erase and programming operations. One skilled in the art will recognize that the general concept of data security, and corresponding systems and methods, are relevant in a vastly diverse set of computing systems, all of which are relevant to the present invention.

The exemplary memory system 100 includes a plurality of memory cells that are addressed via bit-lines and word-lines. The system 100 also includes an address decoder 110 which is coupled to an address bus and identifies a location/address within the cell array based on an input from the address bus. The system 100 includes read/write circuitry 120 that is coupled to a data bus. The read/write circuitry 120 writes data into one or more cells or reads data from one or more cells based on storage instructions and corresponding memory address(es). A charge pump controller 130 may also be present in the memory system 100.

In certain memory systems, both bit and word lines are well-ordered and mapped according to a well-known architecture. For example, as shown in FIG. 2, bit-lines and word-lines are ordered and mapped sequentially from 0 to n−1, and 0 to m−1, respectively. Referring to FIG. 2, lines 210-213 within the read/write circuitry are structured in such a manner that allows data to be read and written in a pre-defined and known algorithm across the memory cells. Lines 220-223 within the address decoder are structured in a corresponding order/map to the structure within the read/write circuitry. As such, operation within the memory may not necessarily function in a purely sequential manner but nevertheless operates in a consistently repeatable pattern across multiple memory systems. Accordingly, the security of the memory may be compromised once this repeatable pattern is identified and be used to attack other devices using the same map.

Data remanence further complicates security within a memory system. It is well known that both volatile and non-volatile memory cells can exhibit data remanence. After erase or overwrite operations, the erased or overwritten data can be reconstructed using well-structured data patterns, exploiting the residual physical data representation. Similarly, data in volatile memories may persist after removal of system power; this is especially pronounced in low-temperature environments. This data remanence behavior further increases the importance of security processes employed in storing data within memory.

What is needed are systems, devices and methods that address the above-described concerns.

SUMMARY OF THE INVENTION

The invention relates to secure memory systems and devices, and more particularly, to systems, devices and methods of generating and applying unique identification elements to a memory mapping and/or encryption process for storing data within memory. These unique identification elements provide an improved, statistically random source from which a memory map or encryption keys may be derived. The application of these keys across various memory architectures result in an improvement in the security of data stored within the memory system.

In certain embodiments, the unique identification element is tied to one or more physical characteristics of the memory system or elements within the system itself. In various embodiments, the unique identification element relates to a semiconductor signature of a semiconductor wafer. A semiconductor signature or characteristic may be derived from or relate to subtle physical differences among semiconductor devices in a single die and among semiconductor dies located at different locations across a wafer. These differences originate from non-uniformity and small imprecisions in lithography and wafer processing steps, even though the devices or dies are intended to be identical. A physical element within a system demonstrates its specificity for its electrical, mechanical, magnetic, chemical and other properties.

The differences may be statistically random and small, and may be measurable as small gradients across the wafer in more than one direction, and very small differences in capacitance, speed, or temperature sensitivity from one transistor to the next. These differences are utilized to generate statistically random numbers that are unique, non-duplicable and repeatable, which are used to strengthen encryption keys derived therefrom.

The unique element may also be used in relation to an address decoder/encoder to further randomize the manner or sequence in which data is stored in memory. In certain embodiments, an encoding/decoding circuit and a unique element within a memory system allows for memory mappings to differ from device to device. In particular, the specific address mapping of the memory depends on the unique element, which is derived from a unique characteristic of the memory device itself. As a result, a compromised address mapping can't be used on other devices to extract data from memory.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

Figure 1:
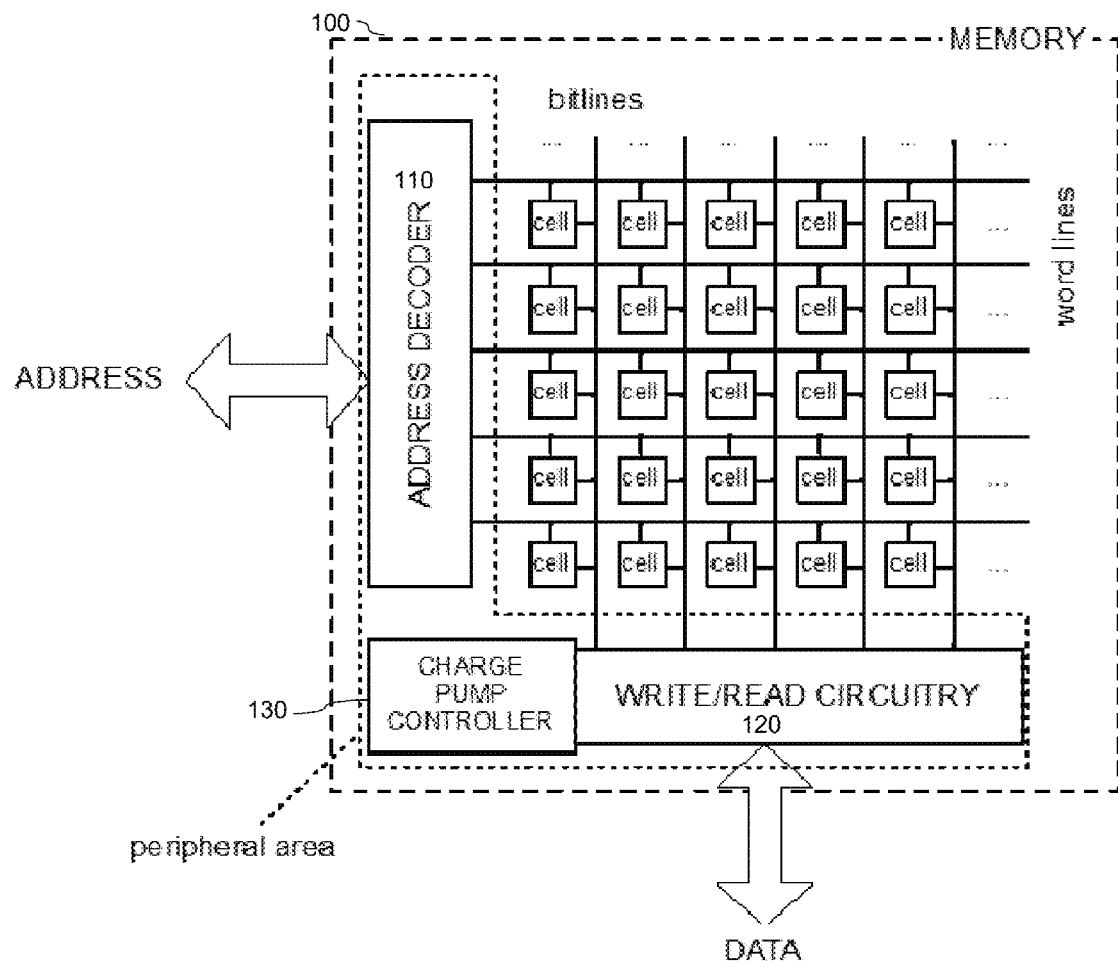
FIG. 1 is a prior art diagram illustrating a typical memory architecture within a storage system.
Figure 2:
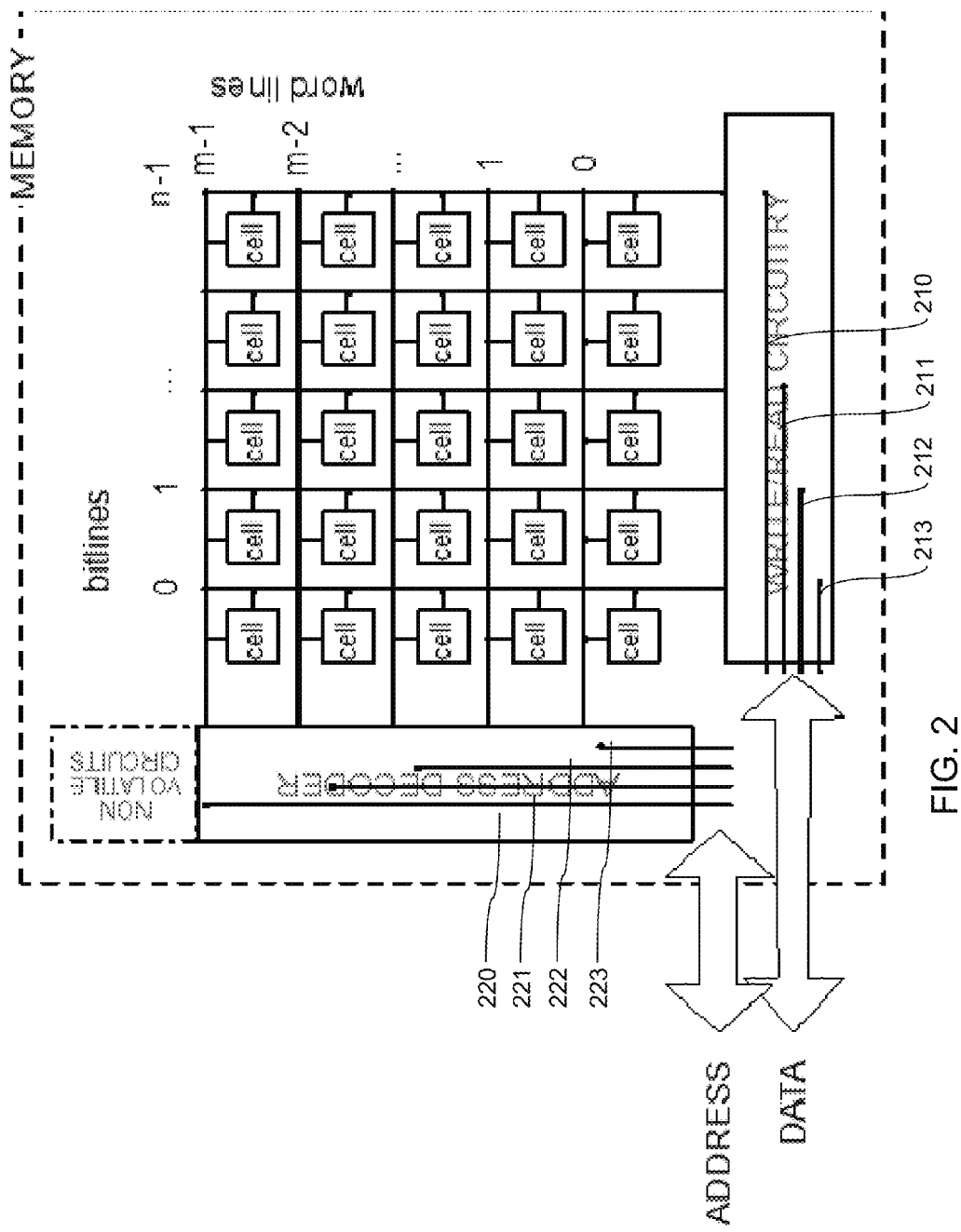
FIG. 2 is a prior art diagram illustrating an exemplary bit and word line mapping in a storage system.

One skilled in the art will recognize that various implementations and embodiments of the invention may be practiced in accordance with the specification. All of these implementations and embodiments are intended to be included within the scope of the invention. Furthermore, one skilled in the art will recognize that the various memory systems may be employed within a numerous and diverse set of different devices and products.

DETAILED DESCRIPTION OF THE PREFERRED EMBODIMENTS

In the following description, for purpose of explanation, specific details are set forth in order to provide an understanding of the present invention. The present invention may, however, be practiced without some or all of these details. The embodiments of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

When the specification makes reference to "one embodiment" or to "an embodiment" it is intended mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Various embodiments of the invention are used to securely store data within storage systems. These various embodiments are not limited to a particular type or size of memory nor are they limited by the device or product in which the memory is located.

A memory may be a component of a system with defined relationships and defined hierarchies. In various embodiments of the invention, the memory includes a unique element that is used to generate encryption keys to securitize data stored within the memory. The unique element may also be used in relation to an address decoder/encoder to further randomize the manner or sequence in which data is stored in memory. These systems, and the memory therein, may be integrated on a single substrate or contain discrete components. Furthermore, embodiments of the invention are applicable to a diverse set of encryption protocols and techniques that may be employed within the system after encryption keys have been generated.

In certain embodiments, the unique element is an identification value associated and/or derived from the physical characteristics of the memory or system in which the memory is located (e.g., microcontroller, memory or module). In one example, a semiconductor signature or characteristic(s) is used as the unique element or are used to seed a process that generates the unique element. A semiconductor signature or characteristic may be derived from or relate to subtle physical differences among semiconductor devices in a single die and among semiconductor dies located at different locations across a wafer. These differences originate from non-uniformity and small imprecisions in lithography and wafer processing steps, even though the devices or dies are intended to be identical. When the physical elements are manufactured from semiconductor processing, they may be placed at different physical locations or oriented differently, and local semiconductor process characteristics are not entirely consistent for these physical elements. As a result, each physical element demonstrates its specificity for its electrical, mechanical, magnetic, chemical and other properties.

The differences may be statistically random and small, and may be measurable as small gradients across the wafer in more than one direction, and very small differences in capacitance, speed, or temperature sensitivity from one transistor to the next. For instance, two otherwise identical capacitors might differ by 0.1% in capacitance due to difference in dielectric thickness and plate area. The former may be caused by variation in a dielectric formation step, while the latter results from variations in lithography or etching. Semiconductor design normally strives to minimize these differences such that performance of the end product is controlled within a certain tolerance. However, the differences are utilized here to generate statistically random numbers that are unique, non-duplicable and repeatable.

One skilled in the art will recognize that other characteristics of the memory or system in which the memory is located may be used as a unique element within the security framework of the memory/system.

Figure 3:
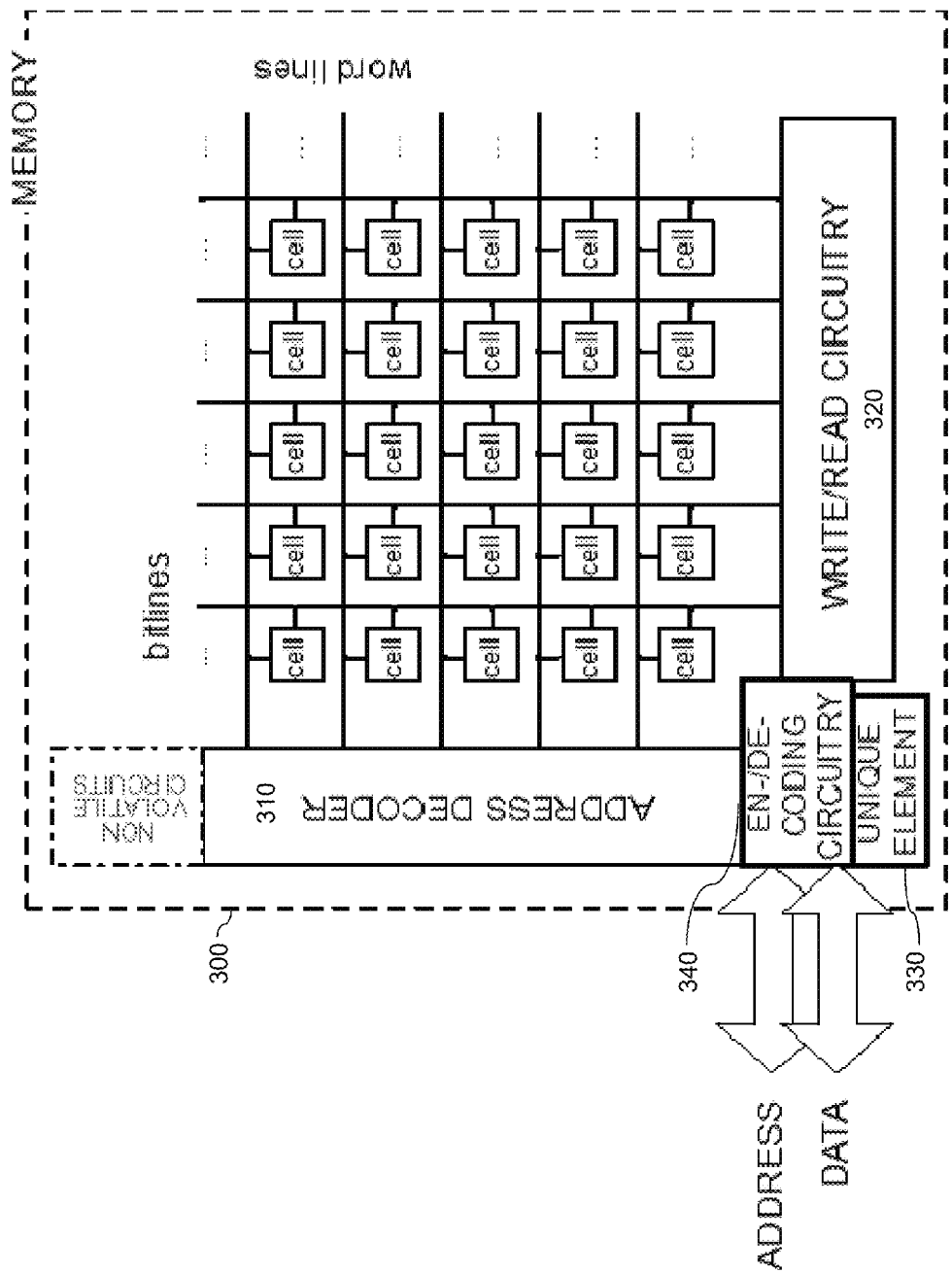
FIG. 3 is a memory architecture with integrated protection according to various embodiments of the invention.

FIG. 3 illustrates a memory with integrated protection according to various embodiments of the invention. The memory 300 comprises a plurality of cells that are coupled to an address decoder 310 via word-lines and are coupled to read/write circuitry 320 via bit-lines. The memory further comprises encoding/decoding circuitry 340 and a unique element 330. In certain implementations, the encoding/decoding circuitry 340 is coupled to both an address bus and a data bus.

The inclusion of the encoding/decoding circuitry 340 and the unique element 330 within the memory allows for memory address mappings to differ from device to device. In particular, the specific address mapping of the memory 300 depends on the unique element 330, which is derived from a unique characteristic of the memory device itself. As a result, a compromised address mapping can't be used on other devices to extract data from memory. Both the encoding/decoding circuitry 340 and the identification element 330 may be physically integrated into the memory (as shown in the figure) and be located within the physical boundaries of the memory peripheral area. In other instances, the identification element 330 and/or encoding/decoding circuitry 340 may be located in physically discrete components within a system. The location of the identification element 330 may vary across different system and may be located anywhere at which a unique characteristic of the system, or components therein, may be extracted. In one example, the identification element 330 may be integrated with the address generation circuit of a microcontroller or memory controller of a complex system according to various embodiments of the invention.

One skilled in the art will recognize that the above described examples illustrate rearrangement of bit and word line, but more elaborate schemes are achieved by embodiments of the invention. For example, address encoding may account for both word line and bit position when creating the mapping or by using cryptographically strong functions such as AES. One skilled in the art will recognize the importance in avoiding collisions in the implementations of cryptographically strong functions.

In a similar fashion to the generation of address mappings, the identification element within the memory may also be used for device specific data content encoding and decoding. In its simplest form, the data encoding function could perform an exclusive-or on data bits based on the identification element. More elaborate encodings could take both data value and the address (bit/word line) into account, or use cryptographically strong processes such as AES (Advanced Encryption Standard). One skilled in the art will recognize that a large number of cryptographic processes may be implemented using the unique element and/or unique address mapping in the generation of encryption keys; all of which fall within the scope of the present invention.

Figure 4:
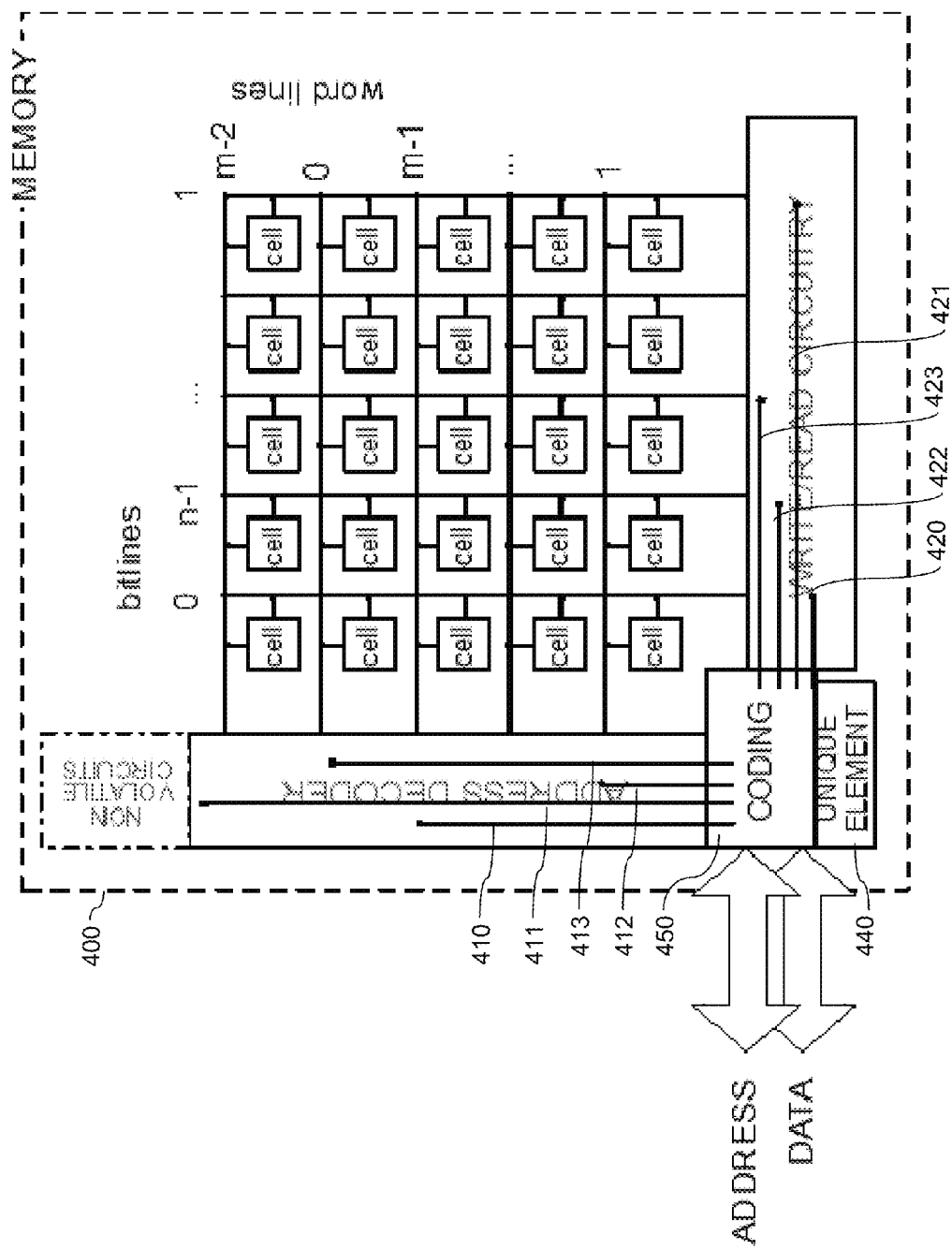
FIG. 4 is a first specific example of a device specific mapping using integrated protection within a memory system according to various embodiments of the invention.
Figure 5:
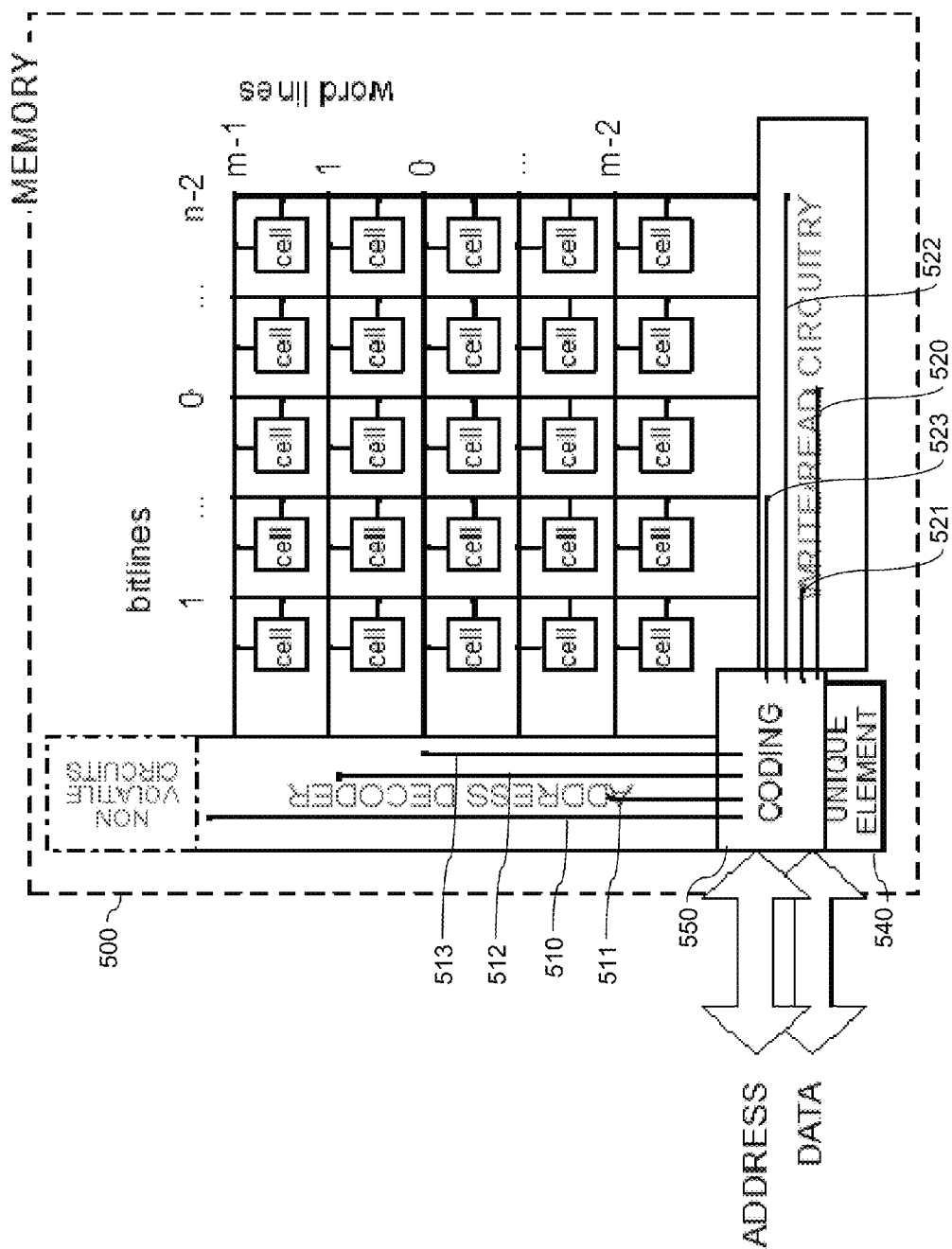
FIG. 5 is a second specific example of a device specific mapping using integrated protection within a memory system according to various embodiments of the invention.

FIGS. 4 and 5 illustrate different memory address mappings across two different devices according to various embodiments. As will be discussed below, the different mappings is a result of a unique element specific to the device (each element is different across the devices) being used to generate a mapping on that particular device. In various embodiments, a value associated with the unique element may be a component within a mapping function that defines a particular mapping for a memory. Because this unique element is different from device-to-device, the address mapping for each device will also be different.

This unique memory map may also be combined with encrypted storage to further enhance the security of the memory. Examples in which encryption keys are generated is described in U.S. Pat. No. 8,555,015, entitled "Multi-Layer Content Protecting Microcontroller," which patent is hereby incorporated by reference. One skilled in the art will recognize that other methods and structures may be used in the generation of encryption keys may also be employed within the spirit and scope of the invention.

Referring to FIG. 4, a memory 400 is illustrated having an encoding/decoding circuitry 450 and a unique element 440. The memory 400 also has a memory mapping that was generated using a value associated the unique element 440. Word-lines 410-413 and bit-lines 420-423 in accordance with the memory mapping.

As previously discussed, the encoding/decoding circuitry 450 may also encrypt data prior to storage using keys derived from the unique element 440. Like the mapping, the encryption keys may be generated using the unique element 440 in accordance with various embodiments of the invention. The combination of both memory mapping and encryption being generated from the unique element 440 results in secure memory architecture that differs, at different levels (encryption and memory mapping), from device-to-device.

Referring to FIG. 5, a different address mapping is illustrated according to various embodiments of the invention. In this example, the memory 500 that has a different mapping, compared to FIG. 4, that includes word-lines 510-513 and bit-lines 520-523. This mapping is generated using the unique element 540 to introduce randomness, specific to the memory 500 or system in which it is embedded, in the address mapping generation process.

As discussed above, the memory 500 may also include data content protection by encrypting the data prior to storage. In certain embodiments, the encoding/decoding circuitry 550 uses encryption keys to encrypt data stored in the memory and decrypt data read from the memory. These encryption keys may be generated using the unique element 540 in accordance with various methods known to one of skill in the art.

Figure 6:
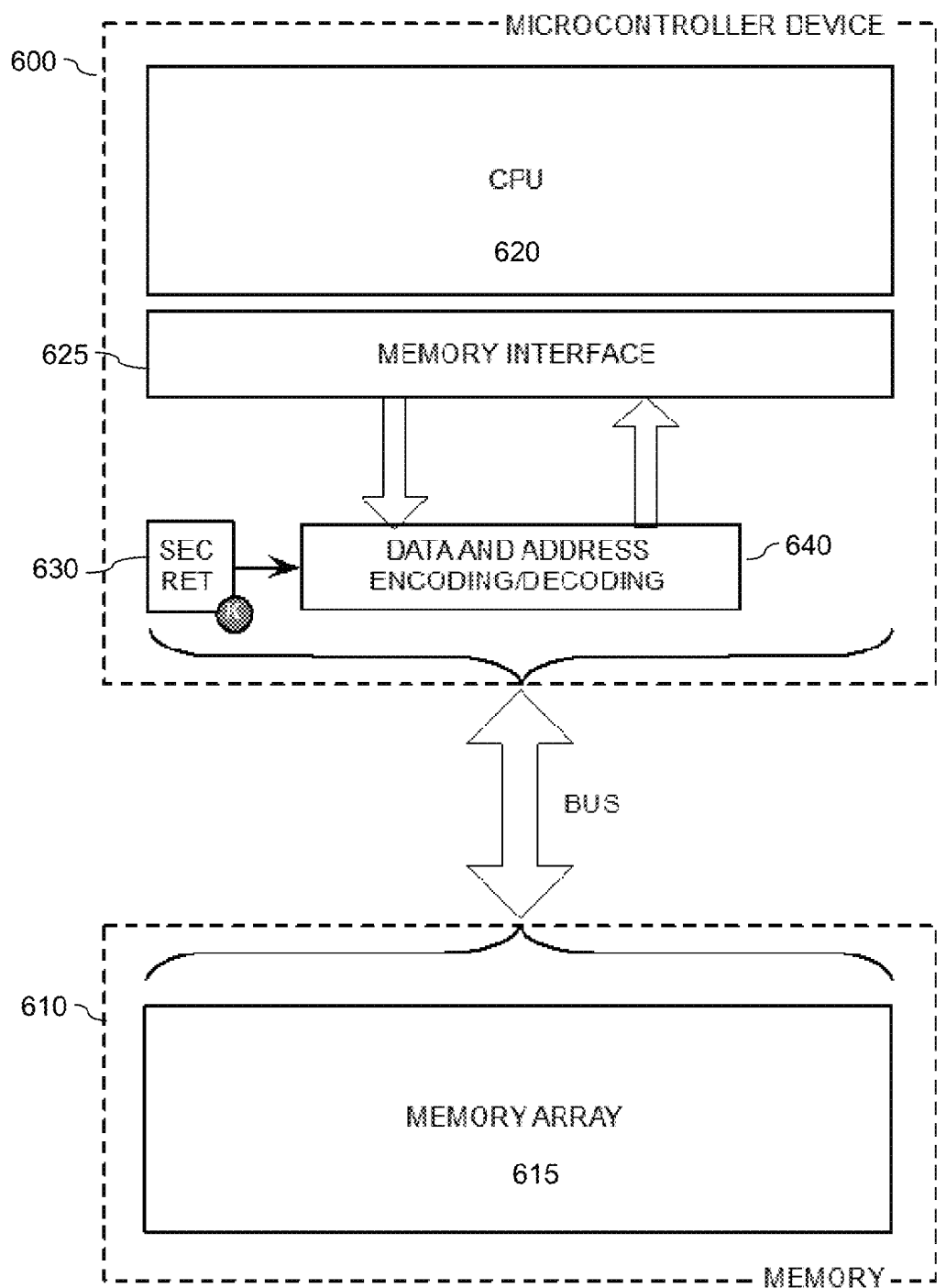
FIG. 6 is a system for storing encoded data according to various embodiments of the invention.

FIG. 6 illustrates a system for storing encoded data according to various embodiments of the invention. The system comprises a microcontroller device 600 that communicates with a memory 610 via a bus. The memory 610 includes a memory array 615 in which memory cells are located to store data.

The microcontroller device 600 comprises a central processing unit 620 communicatively coupled to data and address encoding/decoding circuitry 640 via a memory interface 625. The data and address encoding circuitry 640 is coupled to a secret 630 that can function as an encryption key or as a component in the generation of an encryption key. This secret 630 is generated using a unique element associated with the microcontroller device 600 and/or components therein consistent with the above description. As a result, data may be uniquely encrypted, based at least partially on the use of the unique element for key generation, during storage and transmission of the data.

While FIG. 6 has been described relative to microcontroller architectures (including internal and/or external memory therein), one skilled in the art will recognize that other types of memory systems may utilize various embodiments of the present invention. For example, a large, distributed memory system may use an identification element to both authenticate memory drives to a system as well as generate encryption keys for secure storage of data within the system. Other implementations of the present invention within memory systems are readily apparent to one of skill in the art.

Due to the nature of the unique element, encryption key(s) can be generated on demand and does not have to be stored in non-volatile memory. Unlike prior art, this enables systems based on process technology without non-volatile memory, which may be particularly advantageous because dense new process nodes commonly do not have any non-volatile memory available. In addition, non-volatile memory adds significant cost for those processes where it is available. Furthermore, the system allows for systems that do not require a power source (e.g., a battery) to preserve the key.

In various examples, the microcontroller with the memory may contain more than one unique identification element and associated secrets (e.g., keys derived from the unique identification elements or seeded therefrom), as well as an additional resource separation block. Depending on system requirements, this block can be simple (e.g., using the resource address for separation), or more complex (e.g., accounting for and considering frequency of resource usage, system load, and other system and external state inputs).

The foregoing description of the invention has been described for purposes of clarity and understanding. It is not intended to limit the invention to the precise form disclosed. Various modifications may be possible within the scope and equivalence of the appended claims.

We claim:

1. A memory device of a computing system comprising:
   a plurality of memory cells;
   a unique identification element having a unique and repeatable identification value associated with a physical characteristic derived physical differences originating from semiconductor processing of the memory device itself;
   an address decoder coupled to the plurality of memory cells, the address decoder having a plurality of word lines mapped to the plurality of memory cells according to a memory map derived at least partially from the unique identification value, wherein a specific address mapping of the memory device is determined based upon the unique identification value associated with the unique physical characteristic of the memory device located within the computing system; and
   read/write circuitry coupled to the plurality of memory cells, the read/write circuitry having a plurality of bit lines mapped to the plurality of memory cells.

2. The memory device of claim 1 wherein the plurality of bit lines are mapped to the plurality of memory cells according to the memory map.

3. The memory device of claim 1 further comprising a coding module, the coding module coupled to receive the unique identification value and generate at least one encryption key derived at least partially from the unique identification value.

4. The memory device of claim 3 wherein data stored in the plurality of memory cells is encrypted using the at least one encryption key.

5. The memory device of claim 4 wherein the unique identification value is one of a plurality of values used to generate the encryption key.

6. The memory device of claim 4 wherein the unique identification value is the encryption key.

7. The memory device of claim 1 wherein the unique identification element relates to a semiconductor signature of the microcontroller.

8. The memory device of claim 7 wherein the semiconductor signature is measurable as at least one gradient relating to physical variations of a semiconductor wafer.

9. The memory device of claim 8 wherein the at least one gradient is selected from a group consisting of capacitance, speed sensitivity between transistors, and temperature sensitivity between transistors.

10. A memory device of a computing system comprising:
    a plurality of memory cells;
    a unique identification element having a unique and repeatable identification value associated with a physical characteristic derived physical differences originating from semiconductor processing of the memory device itself;
    read/write circuitry coupled to the plurality of memory cells, the read/write circuitry having a plurality of bit lines mapped to the plurality of memory cells according to a memory map derived at least partially from the unique identification value, wherein the bit-lines memory mapping of the memory device is determined based upon the unique identification value associated with the unique physical characteristic of the memory device located within the computing system; and
    an address decoder coupled to the plurality of memory cells, the address decoder having a plurality of word lines mapped to the plurality of memory cells.

11. The memory device of claim 10 wherein the plurality of word lines are mapped to the plurality of memory cells according to the memory map.

12. The memory device of claim 10 further comprising a coding module, the coding module coupled to receive the unique identification value and generate at least one encryption key derived at least partially from the unique identification value.

13. The memory device of claim 12 wherein the unique identification value is one of a plurality of values used to generate the encryption key.

14. The memory device of claim 12 wherein the unique identification value is the encryption key.

15. The memory device of claim 10 wherein the unique identification element relates to a semiconductor signature of the microcontroller.

16. The memory device of claim 15 wherein the at least one gradient is selected from a group consisting of capacitance, speed sensitivity between transistors, and temperature sensitivity between transistors.

17. A method for creating a mapping within a memory device of a computing system, the method comprising:
    generating by a hardware processor a unique and repeatable identification value associated with a physical characteristic derived physical differences originating from semiconductor processing of the memory device itself, the unique identification value being associated with a gradient measurement related to a semiconductor;
    generating a memory map based at least partially on the unique identification value; and
    defining a plurality of word lines according to the memory map derived at least partially from the unique identification value associated with the unique physical characteristic of the memory device located within the computing system, the plurality of word lines coupled to a plurality of memory cells that store data.

18. The method of claim 17 further comprising the step of defining a plurality bit lines according to the memory map, the plurality of bit lines coupled to the plurality of memory cells that store data.

19. The method of claim 17 wherein the gradient measurement relates to a physical characteristic selected from a group consisting of capacitance, speed sensitivity between transistors, and temperature sensitivity between transistors.

20. The method of claim 17 wherein the unique identification value is a seed for at least one encryption key.

\* \* \* \* \*